(12) United States Patent
Scotney et al.

(10) Patent No.: US 11,416,874 B1
(45) Date of Patent: Aug. 16, 2022

(54) COMPLIANCE MANAGEMENT SYSTEM

(71) Applicant: StratoKey Pty Ltd., Hobart (AU)

(72) Inventors: Anthony Scotney, Hobart (AU);
Sabyasachi Routray, Hobart (AU)

(73) Assignee: StratoKey Pty Ltd.

( * ) Notice: Subject to any disclaimer, the term of this patent is extended or adjusted under 35 U.S.C. 154(b) by 249 days.

(21) Appl. No.: 16/727,387

(22) Filed: Dec. 26, 2019

(51) Int. Cl.
| | | |
|---|---|---|
| H04L 12/00 | (2006.01) | |
| G06Q 30/00 | (2012.01) | |
| G06F 16/28 | (2019.01) | |
| G06F 16/21 | (2019.01) | |
| G06Q 10/10 | (2012.01) | |
| H04L 67/56 | (2022.01) | |
| G06Q 50/26 | (2012.01) | |
| H04L 9/40 | (2022.01) | |
| H04L 43/08 | (2022.01) | |
| G06Q 50/18 | (2012.01) | |

(52) U.S. Cl.
CPC ....... *G06Q 30/0185* (2013.01); *G06F 16/213* (2019.01); *G06F 16/285* (2019.01); *G06Q 10/10* (2013.01); *G06Q 50/18* (2013.01); *G06Q 50/265* (2013.01); *H04L 43/08* (2013.01); *H04L 63/10* (2013.01); *H04L 67/28* (2013.01)

(58) Field of Classification Search
CPC .. G06F 16/125; G06F 16/2365; G06F 40/143; G06F 40/30; G06F 16/212; G16H 40/20; G06Q 10/06; H04L 43/08; H04L 63/10; H04L 67/28
USPC ................ 705/318; 709/223, 224, 225, 226; 708/318
See application file for complete search history.

(56) References Cited

U.S. PATENT DOCUMENTS

| | | |
|---|---|---|
| 8,566,247 B1 | 10/2013 | Nagel |
| 9,076,004 B1 | 7/2015 | Bogorad |
| 10,594,721 B1 | 3/2020 | Scotney |
| 10,798,064 B1 | 10/2020 | Scotney |
| 10,936,751 B1 | 3/2021 | Scotney |
| 11,042,506 B2 * | 6/2021 | Aksionkin ............ G06F 16/125 |

(Continued)

FOREIGN PATENT DOCUMENTS

CN 101398871 A 4/2009

OTHER PUBLICATIONS

"Flashproxy: Transparently Enabling Rich Web Content via Remote Execution", Jun. 17-20, 2008, MobiSys'08, Breckenridge, Colorado, USA, retrieved from http://citeseerx.ist.psu.edu/viewdoc/download;jsessionid=159110DAEE75CBDD05764EBEC094321D?doi=10.1.1.143.6717&rep=rep1&type=pdf on Mar. 11, 2021. (Year: 2008) 13 Pages.

(Continued)

*Primary Examiner* — Frantz Coby
(74) *Attorney, Agent, or Firm* — Mahamedi IP Law LLP

(57) ABSTRACT

A compliance management system generates an enterprise data schema based on a compliance regulation. The system monitors interactions over a network with resources subject to the compliance regulation to generate interaction data sets. The system processes the interaction data sets against the enterprise data schema to categorize at least some of the interactions to trigger events associated with the categories, generate corresponding to the events, and track a compliance metric for each of the tasks generated. The system updates the enterprise data schema based on the compliance metric and the interaction data sets.

20 Claims, 7 Drawing Sheets

(56) References Cited

U.S. PATENT DOCUMENTS

| | | |
|---|---|---|
| 11,089,126 B1 | 8/2021 | Scotney |
| 2003/0079120 A1 | 4/2003 | Hearn |
| 2004/0024826 A1 | 2/2004 | Halahmi |
| 2006/0004719 A1 | 1/2006 | Lawrence |
| 2006/0149590 A1* | 7/2006 | Palmer .................. G16H 40/20 |
| | | 705/2 |
| 2007/0300057 A1 | 12/2007 | Corcoran |
| 2008/0301805 A1 | 12/2008 | Bharara |
| 2009/0063952 A1* | 3/2009 | Raghavachari ....... G06F 40/143 |
| | | 715/234 |
| 2009/0217354 A1 | 8/2009 | Blum |
| 2010/0071052 A1 | 3/2010 | Mao |
| 2010/0088389 A1 | 4/2010 | Buller |
| 2012/0030294 A1 | 2/2012 | Piermot |
| 2012/0117458 A1 | 5/2012 | Holloway |
| 2013/0346453 A1 | 12/2013 | Procopio |
| 2014/0006357 A1 | 1/2014 | Davis |
| 2014/0046906 A1 | 2/2014 | Patiejunas |
| 2014/0095865 A1 | 4/2014 | Yerra |
| 2014/0122866 A1 | 5/2014 | Haeger |
| 2014/0129457 A1 | 5/2014 | Peeler |
| 2014/0282936 A1 | 9/2014 | Fitzgerald |
| 2014/0337614 A1 | 11/2014 | Kelson |
| 2015/0039887 A1 | 2/2015 | Kahol |
| 2015/0067881 A1 | 3/2015 | Badstieber |
| 2015/0249684 A1* | 9/2015 | Zhang .................... H04L 63/20 |
| | | 726/1 |
| 2015/0278545 A1 | 10/2015 | Bigras |
| 2016/0004729 A1* | 1/2016 | Evans ................... G06F 16/212 |
| | | 707/803 |
| 2016/0217269 A1 | 7/2016 | Goettges |
| 2016/0261668 A1 | 9/2016 | Joel |
| 2016/0269371 A1 | 9/2016 | Coimbatore |
| 2017/0034100 A1 | 2/2017 | Zink |
| 2017/0236129 A1* | 8/2017 | Kholkar .................. G06F 40/30 |
| | | 705/317 |
| 2017/0243028 A1 | 8/2017 | LaFever |
| 2017/0286437 A1 | 10/2017 | Stevens |
| 2018/0025011 A1* | 1/2018 | Aksionkin .......... G06F 16/2365 |
| | | 707/692 |
| 2019/0286850 A1 | 9/2019 | Popescu |
| 2020/0065523 A1 | 2/2020 | Fukuda |
| 2020/0073940 A1 | 3/2020 | Grosset |
| 2020/0213345 A1 | 7/2020 | Scotney |
| 2021/0021573 A1 | 1/2021 | Scotney |

OTHER PUBLICATIONS

Linh et al. Compliance monitoring in business processes: Functionalities, application and tool-support. Information Systems. vol. 54. Dec. 2015. pp. 209-234. https://www.sciencedirect.com/science/article/pii/S0306437915000459 (Year: 2015).

* cited by examiner

COMPLIANCE MANAGEMENT SYSTEM

BACKGROUND

Organizations utilize a vast array of cloud, software-as-a-service, and web applications running on systems that host large amounts of sensitive data. The handling and management of this sensitive data can fall under various data handling compliance regulations that stipulate criteria for the security of the data. Regulations can cover operations such as mandating data encryption and ensuring only trusted users have access to sensitive data. Data handling compliance regulations can be vast and wide-ranging and typically create significant overhead for organizations attempting to meet their requirements. With data spread across multiple disparate systems, the monitoring and regulatory compliance process can be complicated, involving many manual human operations and reviews. This manual based procedure is time consuming, resource intensive, and prone to human error.

DETAILED DESCRIPTION

Figure 1:
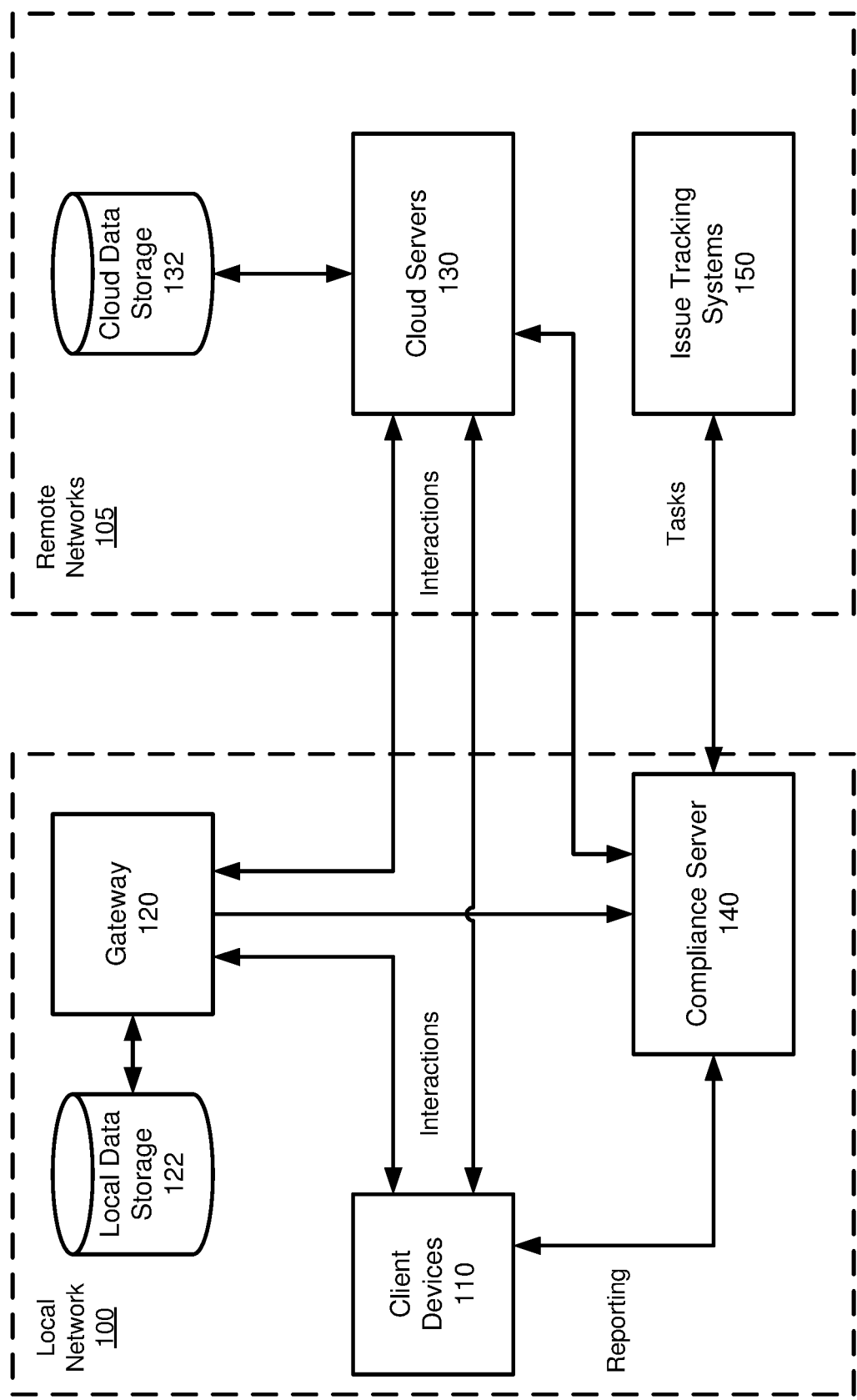
FIG. 1 illustrates an example compliance management system, in accordance with some aspects.

A compliance management system implements end-to-end automation of regulatory compliance, such as compliance with data handling regulations, from detection of potentially non-compliant events to reporting of tasks taken to achieve regulatory compliance. The system translates regulations from legal documents and matches compliance events against the individual sections of each regulation to form technical specifications for regulatory compliance. The system interprets user and system interactions with data subject to regulation through cloud services, software-as-a-service, and web applications and derives event data payloads that are then consumed and analyzed against the technical specifications in real time. If the analysis determines that the interaction is a compliant action, a compliance event may be raised, automatically commented upon by the system, closed, and added towards a regulatory compliance report. If the analysis determines that the interaction is non-compliant, the system can raise a non-compliant event task, dispatch the task according to workflows associated with the regulation, and monitor the task through to remediation. In some aspects, the task is added to a remediation plan, and once closed, to the regulatory compliance report. The technical specifications can be customized to suit any regulation and matched against the relevant compliance legislation. Furthermore, the technical specifications can be used to define new types of task categories and events which can then be reused across organizations. This ensures that the specifications can be shared and operated in a lightweight manner, rather than an inflexible propriety configuration, that is read and interpreted by the compliance management system.

In one aspect, a compliance management system captures an interaction between an enterprise entity and enterprise data subject to a compliance regulation. The compliance management system analyzes the interaction to determine whether the interaction is non-compliant with one or more sections of the compliance regulation and executes a remediation workflow corresponding to each section of the compliance regulation for which the interaction is deemed non-compliant. The compliance management system monitors the remediation workflow to update a compliance status for the corresponding section of the compliance regulation and generates a compliance report listing the sections of the compliance regulation and the compliance status of each section. Therefore, the compliance management system implements end-to-end automation of compliance tasks, from discovery, task creation, internal evaluation (automatic compliant or non-compliant status) and the external dispatch, monitoring and remediation through to close within the compliance server.

Enterprise organizations store and access sensitive data hosted not only on their own servers, but also on remote cloud services. The handling and management of this sensitive data is subject to many data handling compliance regulations that stipulate criteria for the security of the data. Yet despite costly fines and penalties for failing to adhere to the regulations, virtually all organizations are non-compliant in some way due to the vast amounts of data at issue and the difficulties in tracking interactions with the data in an organized manner over time. Compliance is even more difficult for larger organizations that have thousands of employees with access to sensitive data for potentially millions of people, especially when that access is through a complex infrastructure built with multiple systems having unique auditing and logging capabilities.

Although information technology security products and services exist to provide data protection and monitoring, their approaches fail to adequately report on compliance in a useful way. Existing systems can generate reports listing trusted users, what data is encrypted, what backups have been performed, etc., but this is insufficient for determining whether an organization is actually compliant with all of the regulations they may be subject to. For organizations with data across multiple disparate systems, an individual report from one system or application is especially lacking.

Among other benefits, aspects of the compliance management system described herein can break down a regulation piece by piece and marry up an organization's efforts against each of the regulatory requirements, no matter where the efforts occurred or where the data is stored. Then, at audit time, the organization has a compliance report with evidence of compliance with all the regulatory requirements, section by section. For each task that has been performed during a reporting period, the compliance management system enables an auditor to see exactly what the tasks relate to, what steps have been performed on the back end, which steps that members of the organization have taken to meet compliance, etc. Therefore, the compliance management system is fully transparent end-to-end and auditable.

Furthermore, the compliance management system can monitor potentially non-compliant interactions in real-time and generate remediation tasks to bring the organization into compliance quickly. It can also add those remediation tasks to an outstanding issues report so that a compliance team can easily determine what needs to be done to achieve compliance.

Another compliance issue that organizations face is that even if their systems are initially configured to be compliant with data handling regulations, they may fall out of compliance over time as developers create new workflows, edit pages and forms, and push new versions of applications that gather and display potentially-sensitive data. This is especially a problem since developers may not be aware of the specific requirements for regulatory compliance, and an organization's compliance team may not be aware of what effects development and operations are having on the organization's compliance status. Aspects of the compliance management system described herein can detect such changes, raise tasks, dispatch those tasks to issue tracking system, and allocate the tasks to specific teams or people who can resolve them.

Among other benefits, the compliance management system can automatically perform compliance checks with the regulations in the background without human intervention. Tasks can be created, commented on by the system, get closed out as being compliant, and land in a compliance report without a human ever having to touch it. For example, the system can analyze sensitive data against a specific section of a regulation and determine that everyone with access to the data is authorized and that all relevant fields are encrypted, thus complying with that section of the regulation.

As used herein, sensitive data can refer to any information that may be subject to compliance regulations or rules, including official legislation, terms of service, licensing agreements, data handling policies, and the like. As such, sensitive data can include personally identifiable information (PII), personal health information (PHI), and any data of a confidential nature, including pages, resources, user accounts, etc. that may contain or have access to information that may be subject to compliance regulations. Examples of official legislation that regulate the handling of sensitive data include the Health Insurance Portability and Accountability Act (HIPAA) and the General Data Protection Regulation (GDPR).

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates an example compliance management system, in accordance with some aspects. The compliance management system includes various computing devices spanning multiple networks, such as a local network 100 and one or more remote networks 105. The local network 100 can belong to an enterprise organization that stores and accesses sensitive data that may be subject to data handling compliance regulations, whereas the remote networks 105 are managed by third parties such as cloud service and web application vendors. The local network 100 and the remote networks 105 can host data storage containing sensitive data, or other data potentially subject to regulatory compliance, accessible to client devices 110 through a proxy server, which may be implemented on a gateway 120 or compliance server 140. Although illustrated as residing on-premises within the local network 100, in variations, the compliance server 140 can be hosted on a separate network from the gateway 120, such as on the same remote network 105 as the cloud servers 130. Furthermore, the gateway 120 can be hosted on-premises within the local network 100 or in the cloud with the cloud servers 130.

Client devices 110 include any networked computing device capable of accessing sensitive data in the local data storage 122 or cloud data storage 132. Examples of client devices 110 include desktop and laptop computers, mobile phones, tablet computers, etc. These devices can be operated by various entities, including individuals belonging to an enterprise organization and programmatic entities such as software routines. Accordingly, interactions with sensitive data within the compliance management system may refer to human interactions as well as programmed interactions performed by software or hardware itself.

In one implementation, the compliance management system includes a gateway 120. The gateway 120 is a network appliance that operates as an intermediary for requests from client devices 110 seeking resources from the local data storage 122 or the cloud data storage 132 through the cloud servers 130. Therefore, the gateway 120 is located in the path of data access between the client devices 110 and cloud servers 130 and the path of data access between the client devices 110 and the local data storage 122.

As such, the gateway 120 can act as a proxy server between the client devices 110 and the cloud servers 130. As part of the compliance management system, the gateway 120 can implement features of forward proxies, reverse proxies, suffix proxies, and cloud access security broker software. Those features may include selective encryption of sensitive data sent to, or received from, the cloud servers 130, as well as tokenization and anonymization. Furthermore, the gateway 120 can offer a variety of services, including monitoring user activity, warning administrators about potentially hazardous actions, enforcing security policy compliance, and malware detection/prevention.

In some aspects, the gateway 120 implements real-time security features. In further aspects, the gateway 120 implements management features through the use of APIs to inspect data and activity in the cloud to alert and report risky or non-compliant events after the fact, such as through the inspection of firewall or proxy logs for usage of cloud applications. In other implementations, the compliance management system can operate in a standalone mode without the gateway 120.

Cloud servers 130 can include various software-as-a-service (SaaS) platforms and web applications that provide services, including data storage and retrieval, to an enterprise over a network. These scalable services can store vast amounts of data, some of which may be subject to regulation regarding privacy, storage, and handling. Applications running on the cloud servers 130 can include a plugin configured for use with the compliance server 140. As the client devices 110 interact with the cloud servers 130, the plugin collects information on what data they are interacting with and other items such as who they are, the groups they reside within, and other compliance information. The plugin dispatches this information to the compliance server 140, which checks to make sure that the interactions are compliant with any relevant regulations.

In some aspects, the compliance server 140 monitors interactions between the client devices 110 and data through three methods: the gateway 120 acting as an observer, a discovery service integrated with applications, on cloud servers 130, used to access stored data, and an accumulator web service that the compliance server 140 provides. Any given interaction may be detected by multiple methods. For example, a client request for data from cloud data storage 132 may be monitored by the gateway 120 and also by a plugin on the cloud servers 130.

The compliance server 140 analyzes the interaction to determine whether the interaction is non-compliant with one or more sections of a compliance regulation and executes a remediation workflow corresponding to each section of the compliance regulation for which the interaction is deemed non-compliant. The compliance server 140 monitors the remediation workflow to update a compliance status for the corresponding section of the compliance regulation and generates a compliance report listing the sections of the compliance regulation and the compliance status of each section. Compliance reports generated through the use of the compliance server 140 can be made available for review on client devices 110.

The compliance server 140 can also interface with one or more issue tracking systems 150 to perform compliance management. The issue tracking systems 150 include software packages that manage and maintain lists of issues, such as tasks that need to be completed in order to meet compliance requirements of compliance regulations. As part of maintaining a centralized issue registry, issue tracking systems 150 can also perform functions such as resource allocation, time accounting, priority management, and oversight workflow for the compliance management system. Accordingly, the issue tracking systems 150 can include any system used to manage services, projects, configurations, and resources. Examples of issue tracking systems 150 include software bug tracking systems, service management systems, etc.

The local data storage 122 and cloud data storage 132 represent devices that physically store data (e.g., hard disk drives, solid state drives, memory, etc.) as well as any necessary database management software and hardware to access the stored data. The local data storage 122 on the local network 100 contains data that is directly managed by an enterprise, whether those data are stored locally or in a distributed system across multiple networks. Cloud data storage 132 contains data utilized by, and accessed through, the cloud servers 130, including data stored on behalf of the enterprise. Cloud data storage 132 for a given cloud service may be physically located on a network with other service-related hardware or implemented as a distributed database management system.

Figure 2:
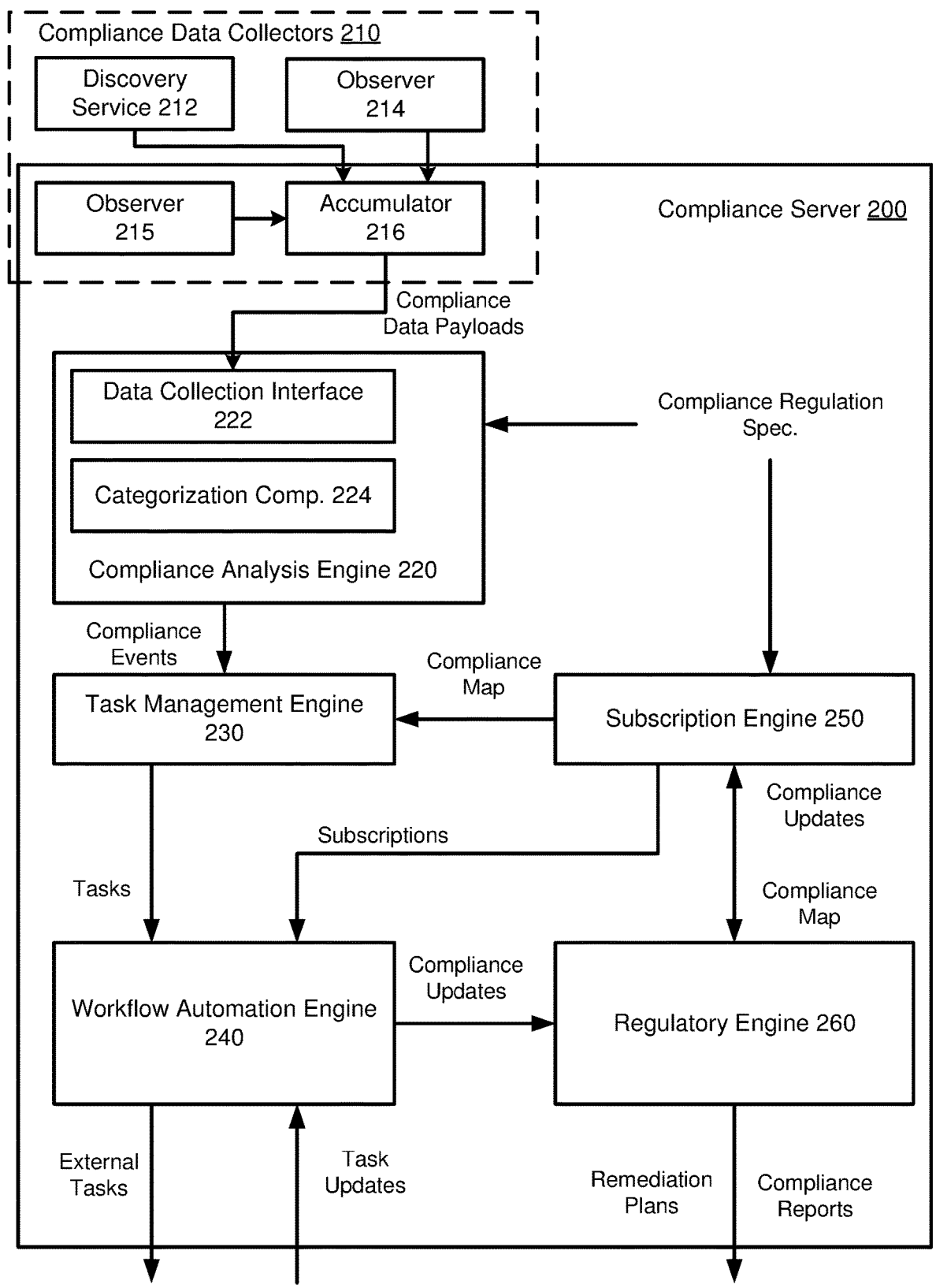
FIG. 2 illustrates example components of a compliance server as part of a compliance management system, in accordance with some aspects.

FIG. 2 illustrates example components of a compliance server 200 as part of a compliance management system, in accordance with some aspects. In addition to the compliance server 200, FIG. 2 illustrates compliance data collectors 210, which act, whether alone or in combination with the other compliance data collectors 210, as a capturing engine to collect and dispatch data to the compliance server 200. With reference to FIG. 1, the compliance server 200 can perform the functions of the compliance server 140, and the compliance data collectors 210 can be implemented on the gateway 120, cloud servers 130, and the compliance server 140 itself.

The compliance server 200 implements an end-to-end automation of regulatory compliance against cloud and SaaS applications. The capturing engine utilizes a mixed mode approach of proxy and external web services interfaces to collect regulated data inputs and interactions. The compliance analysis engine 220, using a feed from the capturing engine, inspects, analyzes, and categorizes the regulated data interactions with designated events. The task management engine 230 listens to the events, automatically raises tasks, and manages lifecycle of the tasks. This further extends to the workflow automation engine 240 which drives the automatic integration of task lifecycles with third party services. The subscription engine 250 manages subscriptions to categories of events organized into compliance maps that control which tasks are raised in automated workflows. The regulatory engine 260 supervises the entire process and builds remediation plans and compliance reports. This flow of compliance data from discovery, workflow, planning, reporting and external dispatch and back creates an exhaustive end-to-end automated compliance management system.

In some aspects, the compliance server 200 communicates with one or more compliance data collectors 210 to receive information that may be relevant to regulatory compliance, such as interactions between client devices and databases containing potentially sensitive data. The compliance data collectors 210 represent a capturing engine that monitors interactions for data input, output, and modifications performed by enterprise entities, including users and automated scripts. These interactions can include events such as encrypting/decrypting data, new user provisioning, filling out forms, etc. The compliance data collectors 210 include a discovery service 212, observers 214, 215 and accumulator 216, each of which can act independently or in combination with the others to monitor interactions and ensure that the compliance management system does not miss any potentially important interactions with sensitive data.

The discovery service 212 operates as a plugin, workflow, or software integration with cloud-based applications having access to databases containing data potentially subject to one or more compliance regulations. The discovery service 212 can detect interactions with the data, new user provisioning, software updates, and other changes to software and hardware configurations that may impact an organization's regulatory compliance. In addition, the discovery service 212 observes user actions, on the local network and through cloud services, in order to collect users, groups, pages, sensitive data, etc. and discover security conditions. In some aspects, the discovery service 212 can pass this information to the accumulator 216 on the compliance server 200. In other aspects, the discovery service 212 can occur internally to the compliance server 200 as a by-product of other information being fed into the accumulator 216, such as through one of the observers 214, 215.

The observer 214 operates as a proxy server as part of a gateway (e.g., the gateway 120 illustrated in FIG. 1) front-ending cloud applications. As such, client devices access cloud servers through the gateway so that the observer 214 can monitor client interactions with the cloud servers and any interactions with sensitive data performed through those cloud servers. The observer 214 can also monitor client interactions with locally stored sensitive data, provided that those interactions go through the observer 214 proxy. In some aspects, an observer 215 on the compliance server 200 operates as a proxy server and collects data directly, thereby eliminating the need for a dedicated gateway. However, some aspects provide for both a dedicated gateway and the compliance server 200 including an observer 215 to act as a proxy server.

In some aspects, the accumulator 216 operates as a REST web service API on the compliance server 200 that can be called from any application. This allows an enterprise to embed custom calls to the API to feed bespoke compliance data into the capturing engine. The accumulator 216 receives data captured by the discovery service 212 and the observers 214, 215.

Upon capturing interactions through any of the compliance data collectors 210, the accumulator 216 dispatches those interactions as compliance data payloads to the compliance analysis engine 220. These compliance data payloads consist of interaction data sets that include any information relevant to determining whether an interaction is compliant with regulatory requirements. Accordingly, the payloads can include information identifying the resource requested (e.g., names of fields, file names, URLs, etc.), an identity of the user or automated process requesting the resource, and any associated user-related information. The compliance data payloads are then processed by a compliance analysis engine 220 on the compliance server 200 to evaluate whether the user has appropriate permissions from a regulatory standpoint to access the regulated data.

The compliance analysis engine 220 maintains a data collection interface 222 to listen for and accept compliance data payloads from the capturing engine. When a compliance data payload is received, the data collection interface 222 passes the event to a compliance categorization component 224 for compliance mapping. The compliance categorization component 224 inspects the information contained in the payload and compares it to a compliance map to determine the type of regulated data, action, and event category for the interaction. If the compliance categorization component 224 determines that the interaction falls into one of the regulatory categories defined in the compliance map (e.g., a user provisioning event, form submission, etc.), the compliance analysis engine 220 raises a compliance event within the compliance server 220, which triggers any subscriptions and leads to the task management engine 230 determining if the event is compliant or non-compliant. For example, an enterprise employee provisions a new user account within a cloud-based human resources application. The capturing engine observes the interaction and sends it to the compliance analysis engine 220, which analyzes the interaction to categorize it as a user provisioning event. The task management engine 230 then raises tasks associated with a user provisioning event to determine whether the event is compliant. If the event is deemed compliant, the system will either file the compliant action or if unique, will raise a task, comment on the task, and close the task marking it as compliant.

In one implementation, in order to generate and configure a compliance map, an organization imports a compliance specification written for a compliance regulation (e.g., the Health Insurance Portability and Accountability Act (HIPAA)). These compliance specifications are schema representations of legal documents that define the regulatory requirements section-by-section along with the outcomes necessary to satisfy each section and events to trigger the workflows to reach those outcomes. The compliance specifications can comprise one or more encoded documents written in a markup language such as Extensible Markup Language (XML).

The compliance specification can be imported into the compliance server 200 through a web service API using an automated process or a visual user interface. Once imported, the compliance server 200 uses the compliance specification to set up task subscriptions and scheduled tasks to perform in order to meet the requirements of the regulation. Each of the subscriptions are linked to events that trigger that subscription as well as one or more compliance outcomes or reports. As a result, the compliance map organizes tasks, plans, reports, and other data structures according to which sections of the compliance regulation they are relevant to. The user interface can also display individual sections of the regulation together with subscriptions and scheduled tasks that are in place to comply with each section of the regulation.

In some aspects, the user interface can display tasks, including any data related to the task, in a visual format and enable users to perform actions to complete some or all steps necessary for the task. For example, in the process of classifying fields on a patient record page from a cloud service, the compliance management system may be unable to determine whether some fields contain sensitive data or not. The system can raise a task for a user to review the patient record page in order to flag which of the unknown fields in the patient record are sensitive data subject to a data handling compliance regulation. When the task is updated or completed, the compliance server 200 can update a data classification matrix for the patient record page to indicate the fields flagged as containing sensitive data so that the compliance analysis engine 220 can confirm whether future interactions with the patient record page comply with the regulation (e.g., the fields containing sensitive data are encrypted, the user who viewed the page is authorized to see sensitive data, etc.). Furthermore, if the patient record page is later modified or replaced, such as through a software update or new service managing patient records, the compliance server 200 can detect the change and raise a new task to ensure that the patient record page is still compliant with its associated regulations.

Accordingly, an organization can customize the operation of the compliance server 200 beyond the base compliance specification in order to suit their requirements and specific data formatting. The compliance specifications can be modified to include custom categories and events. Custom categories can define data elements, such as key-value pairs, in the compliance specification, and the compliance server 200 can dynamically create the new custom categories within the compliance management system based on the provided definition.

In some aspects, the gateway sending compliance data payloads to the compliance server 200 can automatically set one or more detected fields as confidential information based on certain metadata stored with, or associated with, the fields that indicate the fields may contain sensitive information. For example, the gateway can set any encrypted fields as sensitive information under the assumption that encrypted data is more likely to be sensitive compared to unencrypted data. In addition, the user interface can include an export function that a user with access to the compliance server 200 can use to export aspects of the compliance setup, including subscriptions and compliance mapping of data sources and fields to specific sections of a regulation.

Thus, as the compliance analysis engine 220 receives compliance data payloads from the compliance data collectors 210, the compliance analysis engine 220 analyzes the payloads against the compliance map to determine which events to raise.

The task management engine 230 listens to compliance events raised by the compliance analysis engine 220, raises tasks, and manages the lifecycle of those tasks. As such, the task management engine 230 can use compliance maps to raise tasks, trigger respective workflows subscribed to the task category, and link the task to a compliance report or outcome.

In addition, raising tasks based on the analyzed compliance events, the task management engine 230 can set up scheduled tasks according to the compliance specification, which defines how often the task should be performed (e.g., weekly, monthly, yearly) to meet compliance requirements. These scheduled tasks can be performed by entities within or external to the organization, and the results of performing the task can be entered through the compliance server 200 user interface so that compliance reports properly reflect that the task has been completed. In some aspects, scheduled tasks can be tasks that require human intervention, such as checking the validity of off-site backups at set intervals. Scheduled tasks can also trigger automations such as triggering execution of batch files, programs, and web services to automate compliance remediation efforts.

For a given enterprise configuration of the compliance management system, the workflow automation engine 240 subscribes to compliance events, which are mapped to tasks in the task management engine 230, and takes appropriate automated regulatory actions based on the subscribed events. These regulatory actions can represent workflows including actions such as the creation of external tasks in third party applications, triggering programs, and triggering execution of batch files. The workflows can also include relaying lifecycle event actions between the third-party applications and the regulatory engine 260 and taking any necessary associated actions. Accordingly, the workflow automation engine 240 drives the automatic integration of task lifecycles with third party services such as the issue tracking systems 150 illustrated in FIG. 1.

In some aspects, the workflow automation engine 240 is configured with a set of subscriptions from a subscription engine 250. The subscriptions associate one or more regulatory actions to task categories and events that get generated within the compliance server 200. As a result, the workflow automation engine 240 automatically picks up events that are generated within the system. Based on the subscription configuration, the workflow automation engine 240 can automatically schedule internal regulatory actions to take, allocate the regulatory actions to appropriate entities within the enterprise (e.g., compliance team members or automated systems), and track compliance metrics for each task, such as whether the task has been completed satisfactorily in order to put the organization in compliance with the regulatory rule in question. The workflow automation engine 240 can also place automatic comments on those issues as part of a report, such as a compliance report, outstanding issues report, or remediation plan.

In addition to automating internal workflows, for some regulatory actions, the workflow automation engine 240 generates external tasks (e.g., service tickets) in third party issue tracking systems. For example, the workflow automation engine 240 may create a ticket for a member of an enterprise information technology team to confirm that sensitive data is being properly backed up in conformance with a legal regulation requiring data backups. The workflow automation engine 240 can monitor the issue tracking system and pull any updates, such as status reports and comments, back into the compliance server 200 so that any compliance updates are reflected in future compliance reports. As an issue is resolved in an external system, the workflow automation engine 240 responds accordingly and issues automated comments on the task within the compliance server 200. If the issue is closed or resolved, the workflow automation engine 240 can perform the same action on the task in the compliance management system and update the compliance metric to indicate the status of the task. For example, upon a ticket being closed out in the issue tracking system, the workflow automation engine 240 can close any corresponding tasks within the compliance server 200, which can trigger the regulatory engine 260 to remove the task from any outstanding issues reports or remediation plans.

In some aspects, the subscription engine 250 associates regulatory actions to sets of task categories and events through a subscription system. Through the use of compliance-mapped subscriptions, the system ensures that tasks are only generated for events that are relevant to one or more compliance requirements. Furthermore, the subscriptions ensure that generated events land in the correct places in compliance reports, thereby simplifying the presentation and ability to determine what actions an enterprise has taken to remain compliant with any given regulation.

For a given enterprise and compliance regulation, its corresponding compliance map matches sections of the regulation to compliance event types and categories of tasks, which creates subscriptions for the workflow automation engine 240.

In some aspects, the compliance server 200 includes a regulatory engine 260 which supervises the compliance management process and generates the reporting for the compliance management system. As compliance tasks are raised that meet the criteria defined in the compliance map, the task management engine 230 allocates these tasks to one or more forms of reporting, which may include the outstanding issues reports, remediation plans, and regulatory compliance reports.

The regulatory engine 260 generates a remediation plan showing tasks raised against the regulation and the current progress of the tasks for a given reporting period. Also, the regulatory engine 260 generates an outstanding issues report to show tasks affecting regulatory compliance that have not been completed for the reporting period. Report regulatory sections are marked non-compliant until relevant compliance tasks have been raised and completed. As progress towards task completion is updated, either through human interaction or automation, the regulatory engine 260 can reflect those compliance updates in the reports. For example, once a task assigned to a section of a regulation is completed, the regulatory engine 260 marks that section in the regulatory report as "compliant" and notes the task ID for audit traceability.

In some aspects, the compliance server 200 can display the outstanding issues reports, remediation plans, and regulatory compliance reports on the user interface, organized according to individual sections of a corresponding compliance regulation. The compliance report can be generated and updated in real-time to reflect the status of compliance tasks raised against each regulation section. Once the tasks for a section are completed and marked as compliant, the status within the compliance report for the specific regulatory section is marked as compliant. In further aspects, reports generated by the regulatory engine 260, including the outstanding issues reports, remediation plans, and regulatory compliance reports, can be transmitted outside the compliance server 200 via email, embedded in external applications, or through other methods.

In some examples, the regulatory engine 260 can flag regulation sections or tasks as 'shared responsibility' for activities that go beyond the scope of the organization, which helps present an accurate compliance report for the organization.

Methodology

Figure 3A:
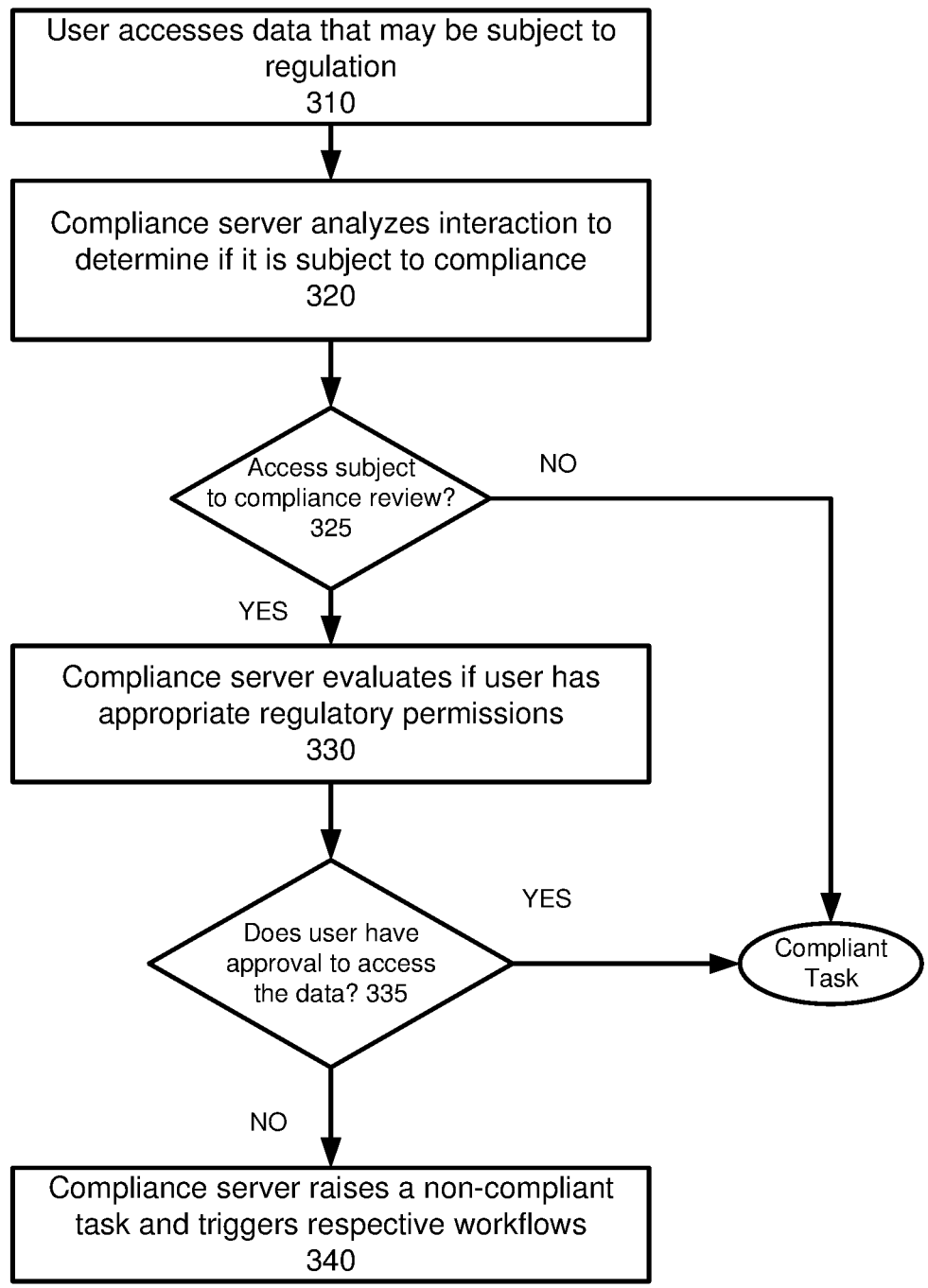
FIG. 3A illustrates a method of managing compliance with a regulation in an example use case.
Figure 3B:
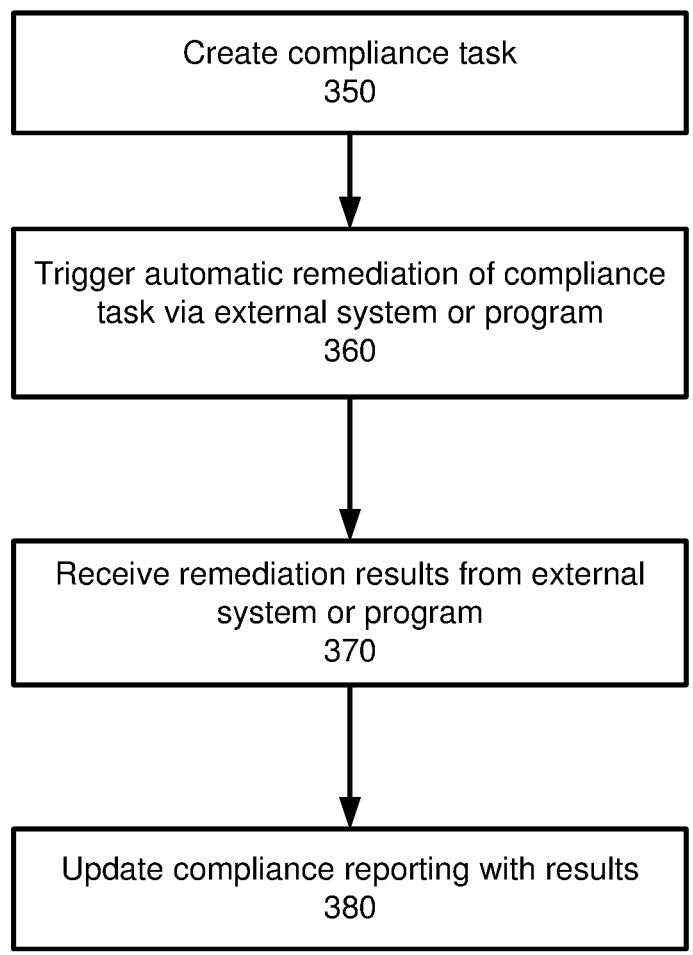
FIG. 3B illustrates a method of automatic resolution using a compliance management system.
Figure 4:
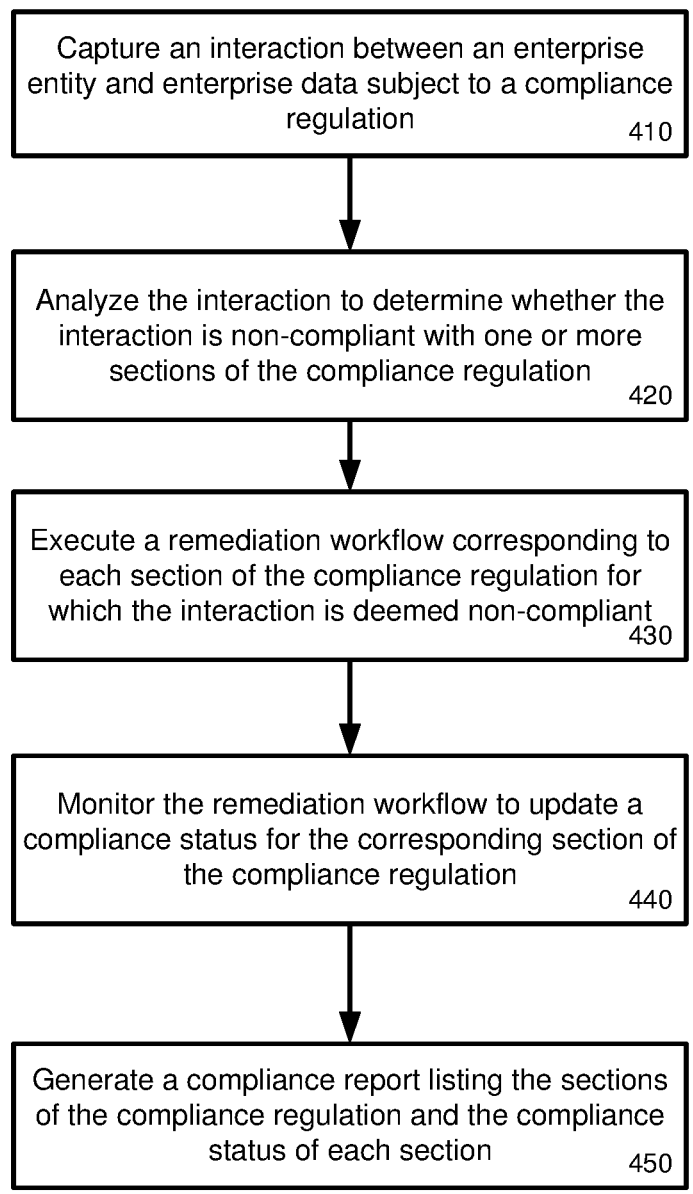
FIG. 4 illustrates an example method for performing compliance management with a compliance management system, in accordance with some aspects.
Figure 5:
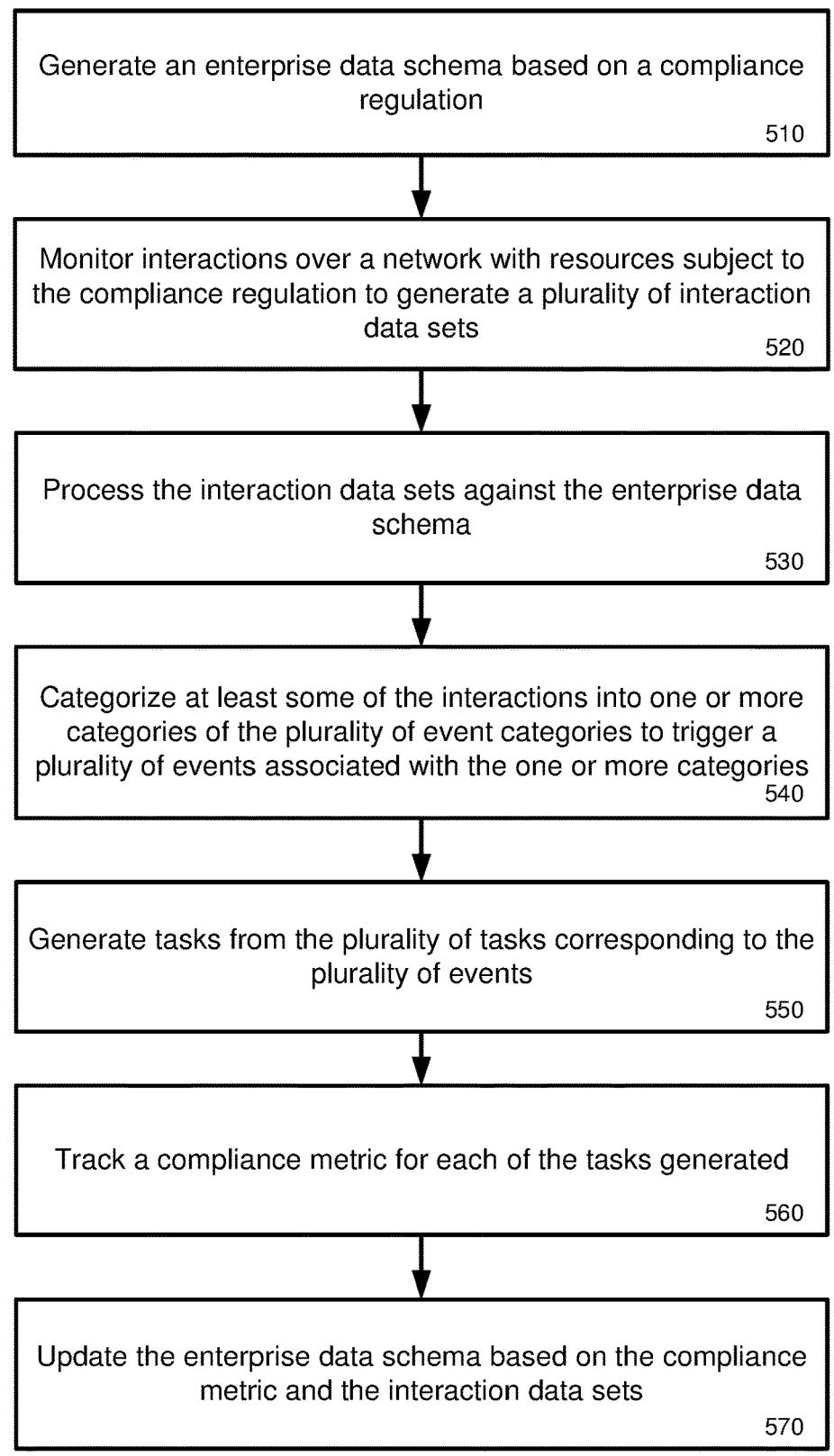
FIG. 5 illustrates an example method for forming a technical specification for regulatory compliance using a compliance management system, in accordance with some aspects.

FIG. 3A illustrates a method of managing compliance with a regulation in an example use case. FIG. 3B illustrates a method of automatic resolution using a compliance management system. FIG. 4 illustrates an example method for performing compliance management with a compliance management system. FIG. 5 illustrates an example method for forming a technical specification for regulatory compliance using a compliance management system. While operations of the methods are described below as being performed by specific components, modules, or systems, it will be appreciated that these operations need not necessarily be performed by the specific components identified and could be performed by a variety of components and modules, potentially distributed over a number of machines. Accordingly, references may be made to elements of the compliance server 200 for the purpose of illustrating suitable components or elements for performing a step or sub step being described. Alternatively, at least certain ones of the variety of components and modules described in compliance server 200 can be arranged within a single hardware, software, or firmware component. It will also be appreciated that some of the steps of this method may be performed in parallel or in a different order than illustrated.

With reference to FIG. 3A, a user of a client device accesses data (e.g., by viewing a patient record containing protected health information) through one or more of a gateway 120, a cloud server 130, or a compliance server 140 as described with FIG. 1 (310). A compliance data collector, either on the gateway, the compliance server, or plugged-in to a web application that provided access to the data, detects the user's access to the data. In response, the compliance data collector transmits information corresponding to the user access in the form of a compliance data payload.

The compliance server analyzes the content of the interaction between the user and the data from the received compliance data payload (320). In some aspects, the content includes an identifier for resource accessed, the user requesting the resource, and associated user related information.

Based on the analysis, the compliance server determines whether the interaction is subject to compliance review (325). In some aspects, the content of the interaction is analyzed against one or more compliance specifications to determine whether the interaction belongs to an event category that is mapped to at least one section of a compliance regulation. Upon determining that the interaction does not belong to such an event category, the compliance server can treat the interaction as compliant.

Upon determining that the interaction does belong to an event category that is mapped to at least one section of a compliance regulation, the compliance server evaluates whether the user has appropriate permissions from a regulatory standpoint to access the data (330). For example, the compliance server can analyze whether interactions with the same or similar parameters have been previously approved or whether the interaction is new.

If the user interaction is determined to have been approved previously, the compliance server can automatically raise a task and close it as a compliant task (335). This contributes an automated compliant review in the compliance system for the sake of reporting.

If the user does not have the pre-approval to access the data, the compliance server raises a task. The compliance server automates the task through the appropriate workflows defined in the compliance map to either bring the task to the attention of a member of an enterprise compliance team, automatically dispatch the task to an external ticketing system for resolution, or trigger external systems, programs, batch files, etc. for automated resolution.

With reference to FIG. 3B, a compliance management system creates a compliance task corresponding to a requirement of a compliance regulation (350). For example, the compliance management system may create a task to ensure that an enterprise compiles with a regulation that requires the enterprise to store backups and confirm the integrity of those backups on a regular basis.

In some aspects, the compliance management system can trigger automatic remediation of the compliance task via an external system or program (360). For example, the compliance management system can trigger an external batch process that is specifically created to confirm that the enterprise is compliant with a backup requirement. The external batch process can download an archive backup of enterprise data, extract the data from the archive, and verify the data to confirm its integrity.

As the external system or program completes the compliance task (or a sub-task of the compliance task), the external system can transmit results back to the compliance server (370). For example, upon confirming the integrity of enterprise backups, the external batch process reports back to the compliance management system that the backup data is intact and complete.

Upon receiving the results of the external process, the compliance management system can update aspects of compliance reporting, such as a compliance report, outstanding issues report, or remediation plan (380). For example, upon receiving an indication that the enterprise backups are intact and complete, the compliance management system can update the compliance report for the corresponding regulation to indicate that the enterprise is compliant with the regulatory backup requirement.

With reference to FIG. 4, a compliance management system can capture an interaction between an enterprise entity and enterprise data subject to a compliance regulation (410). The compliance management system can analyze the interaction to determine whether the interaction is non-compliant with one or more sections of the compliance regulation (420). The compliance management system can execute a remediation workflow corresponding to each section of the compliance regulation for which the interaction is deemed non-compliant (430). The compliance management system can monitor the remediation workflow to update a compliance status for the corresponding section of the compliance regulation (440). The compliance management system can generate a compliance report listing the sections of the compliance regulation and the compliance status of each section (450).

With reference to FIG. 5, a compliance management system can generate an enterprise data schema, based on a compliance regulation, which defines a plurality of event categories and a plurality of tasks. In addition, the enterprise data schema can comprise a plurality of sections, with each section corresponding to a compliance rule of the compliance regulation (510).

The compliance management system can monitor interactions over a network with resources subject to the compliance regulation to generate a plurality of interaction data sets (520). In some aspects, the interaction data sets include information identifying a resource requested, an identity of a user or automated process that requested the resource, and any associated user-related information. In some aspects, the compliance management system includes a proxy server, located in a path of data access between the resources and the user or automated process that requested the resource, to monitor the interactions.

The compliance management system can process the interaction data sets against the enterprise data schema (530) to categorize at least some of the interactions into one or more categories of the plurality of event categories to trigger a plurality of events associated with the one or more categories (540). Further, the compliance management system can process the interaction data sets against the enterprise data schema to generate tasks from the plurality of tasks corresponding to the plurality of events (550) and track a compliance metric for each of the tasks generated (560).

Based on the compliance metric and the interaction data sets, the compliance management system can then update the enterprise data schema (570). In some aspects, the compliance management system updates the enterprise data schema upon completion of at least one of the tasks. In some aspects, the enterprise data schema is updated to indicate that the user or automated process that requested the resource has approval to access the resource upon determining that the compliance metric indicates that the interaction is compliant with the compliance rule of the compliance regulation.

In some aspects, the compliance management system performs a reporting action based on the compliance metric for each of the tasks generated, which can include generating a compliance report organized by each of the compliance rules of the compliance regulation.

Computer System

Figure 6:
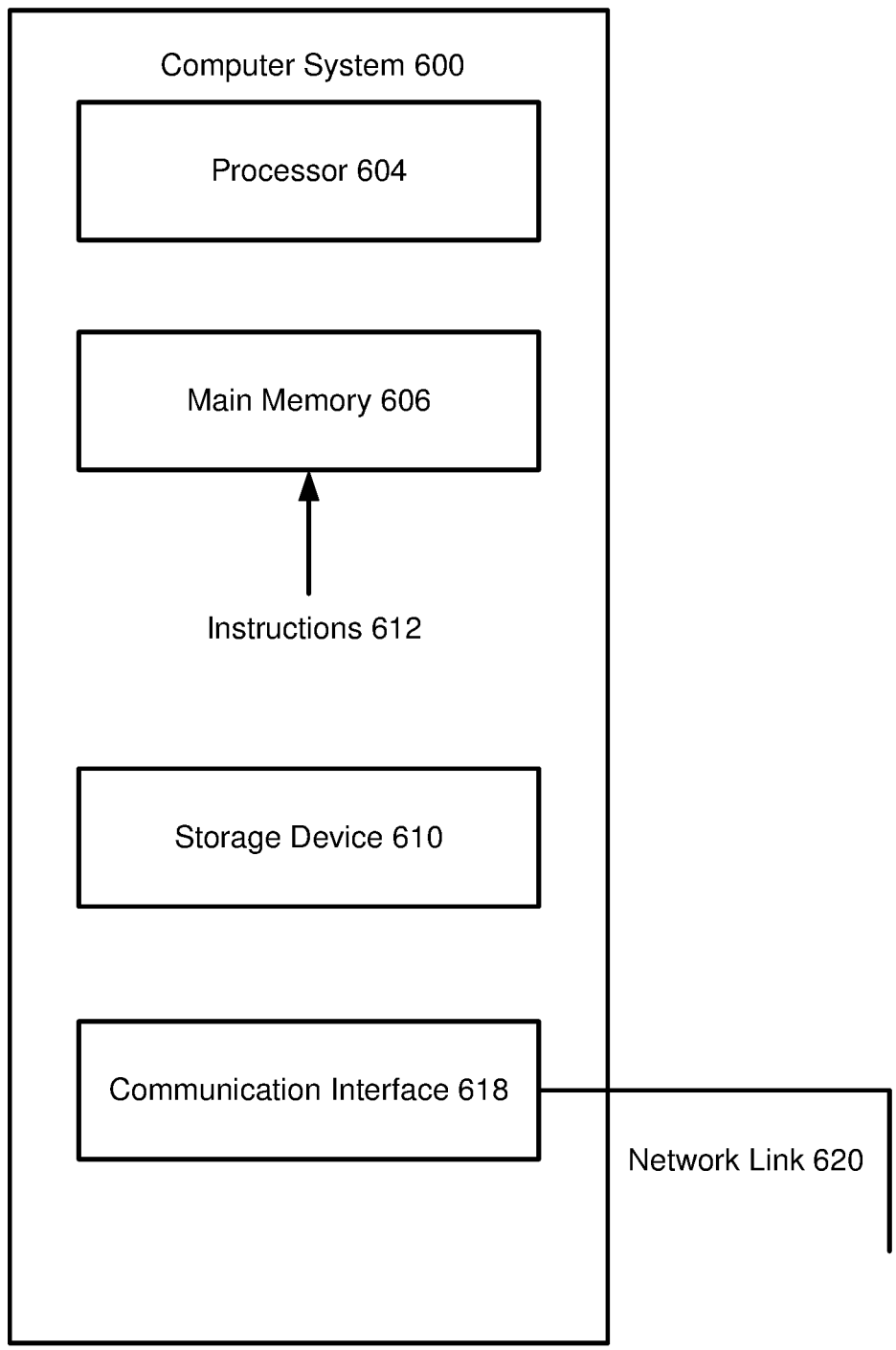
FIG. 6 is a block diagram that illustrates a computer system upon which aspects described herein may be implemented.

FIG. 6 is a block diagram that illustrates a computer system upon which aspects described herein may be implemented. For example, in the context of FIG. 1, the gateway 120 and/or the compliance server 140 may be implemented using one or more servers such as described by FIG. 6.

In an aspect, computer system 600 includes processor 604, memory 606 (including non-transitory memory), storage device 610, and communication interface 618. Computer system 600 includes at least one processor 604 for processing information. Computer system 600 also includes the main memory 606, such as a random-access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. The storage device 610, such as a magnetic disk or optical disk, is provided for storing information and instructions. The communication interface 618 may enable the computer system 600 to communicate with one or more networks through use of the network link 620 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 600 for implementing the techniques described herein. According to one aspect, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A compliance management system comprising:
   a memory resource to store instructions; and
   one or more processors that execute the instructions stored in the memory resource to perform operations including:
      generating an enterprise data schema representing a compliance regulation, the enterprise data schema defining a plurality of event categories for interactions with resources comprising data subject to the compliance regulation and a plurality of tasks, the enterprise data schema comprising a plurality of sections, each section of the enterprise data schema corresponding to a compliance rule of the compliance regulation;

monitoring interactions over a network with the resources comprising data subject to the compliance regulation to generate interaction data sets describing one or more interactions with the resources; and processing the interaction data sets against the enterprise data schema to, for at least one interaction of the one or more interactions:
(i) categorize the interaction into one or more event categories of the plurality of event categories,
(ii) generate one or more tasks corresponding to the one or more event categories,
(iii) track one or more compliance metrics for the interaction, and
(iv) updating a compliance status for the interaction based on the compliance metric.

2. The compliance management system of claim 1, wherein the compliance status for the interaction is updated upon completion of at least one of the one or more tasks.

3. The compliance management system of claim 1, wherein the interaction data sets include information identifying the resource requested, an identity of a user or automated process that requested the resource, and associated user-related information.

4. The compliance management system of claim 3, wherein the interactions with resources comprising data subject to the compliance regulation are monitored by a proxy server located in a path of data access between the resources and the user or automated process that requested the resource.

5. The compliance management system of claim 3, wherein the compliance status is updated to indicate that the user or automated process that requested the resource has approval to access the resource upon determining that the compliance metric indicates that the interaction is compliant with the compliance rule of the compliance regulation.

6. The compliance management system of claim 1, wherein the memory resource stores instructions that, when executed by the one or more processors, cause the one or more processors to perform further operations including:
performing a reporting action based on the one or more compliance metrics for the one or more interactions.

7. The compliance management system of claim 6, wherein the reporting action includes generating a compliance report organized by each of the compliance rules of the compliance regulation.

8. A non-transitory computer-readable medium that stores instructions, executable by one or more processors, to cause the one or more processors to perform operations that comprise:
generating an enterprise data schema representing a compliance regulation, the enterprise data schema defining a plurality of event categories for interactions with resources comprising data subject to the compliance regulation and a plurality of tasks, the enterprise data schema comprising a plurality of sections, each section of the enterprise data schema corresponding to a compliance rule of the compliance regulation;
monitoring interactions over a network with the resources comprising data subject to the compliance regulation to generate interaction data sets describing one or more interactions with the resources; and
processing the interaction data sets against the enterprise data schema to, for at least one interaction of the one or more interactions:
(i) categorize the interaction into one or more event categories of the plurality of event categories,
(ii) generate one or more tasks corresponding to the one or more event categories,
(iii) track one or more compliance metrics for the interaction, and
(iv) updating a compliance status for the interaction based on the compliance metric.

9. The non-transitory computer-readable medium of claim 8, wherein the compliance status for the interaction is updated upon completion of at least one of the one or more tasks.

10. The non-transitory computer-readable medium of claim 8, wherein the interaction data sets include information identifying the resource requested, an identity of a user or automated process that requested the resource, and any associated user-related information.

11. The non-transitory computer-readable medium of claim 10, wherein the interactions with resources comprising data subject to the compliance regulation are monitored by a proxy server located in a path of data access between the resources and the user or automated process that requested the resource.

12. The non-transitory computer-readable medium of claim 10, wherein the compliance status is updated to indicate that the user or automated process that requested the resource has approval to access the resource upon determining that the compliance metric indicates that the interaction is compliant with the compliance rule of the compliance regulation.

13. The non-transitory computer-readable medium of claim 8 storing further instructions that, when executed by the one or more processors, cause the one or more processors to cause the one or more processors to perform operations that comprise:
performing a reporting action based on the one or more compliance metrics for the one or more interactions.

14. The non-transitory computer-readable medium of claim 13, wherein the reporting action includes generating a compliance report organized by each of the compliance rules of the compliance regulation.

15. A method of compliance management in a networked computer system, the method being implemented by one or more processors and comprising:
generating an enterprise data schema representing a compliance regulation, the enterprise data schema defining a plurality of event categories for interactions with resources comprising data subject to the compliance regulation and a plurality of tasks, the enterprise data schema comprising a plurality of sections, each section of the enterprise data schema corresponding to a compliance rule of the compliance regulation;
monitoring interactions over a network with the resources comprising data subject to the compliance regulation to generate interaction data sets describing one or more interactions with the resources; and
processing the interaction data sets against the enterprise data schema to, for at least one interaction of the one or more interactions:
(i) categorize the interaction into one or more event categories of the plurality of event categories,
(ii) generate one or more tasks corresponding to the one or more event categories, (iii) track one or more compliance metrics for the interaction; and
(iv) update a compliance status for the interaction based on the compliance metric.

16. The method of claim 15, wherein the compliance status for the interaction is updated upon completion of at least one of the one or more tasks.

17. The method of claim 15, wherein the interaction data sets include information identifying the resource requested, an identity of a user or automated process that requested the resource, and any associated user-related information.

18. The method of claim 17, wherein the interactions with resources comprising data subject to the compliance regulation are monitored by a proxy server located in a path of data access between the resources and the user or automated process that requested the resource.

19. The method of claim 17, wherein the compliance status is updated to indicate that the user or automated process that requested the resource has approval to access the resource upon determining that the compliance metric indicates that the interaction is compliant with the compliance rule of the compliance regulation.

20. The method of claim 19, further comprising:
performing a reporting action based on the one or more compliance metrics for the one or more interactions.

* * * * *